(12) United States Patent
Byun et al.

(10) Patent No.: US 9,012,059 B2
(45) Date of Patent: Apr. 21, 2015

(54) SECONDARY BATTERY

(75) Inventors: Sangwon Byun, Yongin-si (KR);
Jeongwon Oh, Yongin-si (KR); Sooseok Choi, Yongin-si (KR); Joongheon Kim, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 191 days.

(21) Appl. No.: 13/344,744

(22) Filed: Jan. 6, 2012

(65) Prior Publication Data

US 2012/0225342 A1 Sep. 6, 2012

(30) Foreign Application Priority Data

Mar. 4, 2011 (KR) ......................... 10-2011-0019398

(51) Int. Cl.
*H01M 2/18* (2006.01)
*H01M 2/02* (2006.01)
*H01M 10/04* (2006.01)

(52) U.S. Cl.
CPC .......... *H01M 2/024* (2013.01); *H01M 10/0431* (2013.01); *H01M 10/0468* (2013.01)

(58) Field of Classification Search
CPC ..................... H01M 10/0431; H01M 10/0468; H01M 2/024
USPC .............................. 429/130, 153, 159, 120, 94
See application file for complete search history.

(56) References Cited

U.S. PATENT DOCUMENTS 3,421,944 A * 1/1969 Bauer ................................ 429/3
6,461,757 B1 * 10/2002 Sasayama et al. .............. 429/59
6,743,546 B1 * 6/2004 Kaneda et al. ................. 429/127
2009/0029239 A1 * 1/2009 Koetting et al. ................. 429/82
2010/0143773 A1 6/2010 Honbou
2011/0052965 A1 * 3/2011 Kim et al. ...................... 429/156

FOREIGN PATENT DOCUMENTS

| JP | 2002-100328 A | | 4/2002 |
| JP | 2002-100341 A | | 4/2002 |
| JP | 2005174707 A | * | 6/2005 |
| JP | 2005-285515 A | | 10/2005 |
| JP | 2009170137 A | * | 7/2009 |
| JP | 2010-135170 A | | 6/2010 |

OTHER PUBLICATIONS

English translation of JP application 2005174707 A, Jun. 2005, Tononishi, Masamitsu.*
English translation of JP 2009170137 A, Jul. 2009, Japan, Minamisaka et. al.*
Korean Office Action in KR 10-2011-0019398, dated Aug. 3, 2012 (Byun, et al.).
Korean Notice of Allowance Dated Feb. 28, 2013.

* cited by examiner

*Primary Examiner* — Jonathan Jelsma
*Assistant Examiner* — Rashid Alam
(74) *Attorney, Agent, or Firm* — Lee & Morse, P.C.

(57) ABSTRACT

A secondary battery includes at least two electrode assemblies, each electrode assembly including a first electrode plate, a separator, and a second electrode plate, a case accommodating the at least two electrode assemblies, electrode terminals electrically connected to the at least two electrode assemblies, a cap plate sealing the case and exposing the electrode terminals to the outside, and at least one insulation member between the at least two electrode assemblies, the insulation member defining a space between the at least two electrode assemblies.

19 Claims, 6 Drawing Sheets

SECONDARY BATTERY

BACKGROUND

1. Field

Embodiments relate to a secondary battery.

2. Description of the Related Art

Unlike primary batteries, which cannot be recharged, secondary batteries can be repeatedly charged and discharged. Low capacity secondary batteries that use single battery cells may be used as power sources for various portable electronic devices, e.g., cellular phones or camcorders. High capacity secondary batteries that use tens of battery cells connected to each other in a battery pack may be used as power sources for driving motors, e.g., electric scooters or hybrid electric vehicles (HEV).

Secondary batteries may be classified into different types, e.g., cylindrical and prismatic types. A unit battery includes an electrode assembly having positive and negative electrodes and a separator interposed between the positive and negative electrodes, a case for receiving the electrode assembly, and a cap assembly for sealing the case. Positive and negative electrode terminals may be electrically connected to the electrode assembly and outwardly protrude and extend through the cap assembly.

Additionally, a safety vent may be formed in the cap plate. The safety vent is capable of releasing gas when the internal pressure rises to a predetermined pressure. An electrolyte injection hole may be formed at one side of the cap plate. The electrolyte injection hole provides for a passage for injecting an electrolyte into the case. A ball may be press-fit into the electrolyte injection hole for sealing.

SUMMARY

Embodiments provide a secondary battery capable of reducing swelling by increasing internal space efficiency and of improving a puncture characteristic.

According to an embodiment, a secondary battery is provided. The secondary battery may include at least two electrode assemblies, each electrode assembly including a first electrode plate, a separator, and a second electrode plate, a case accommodating the at least two electrode assemblies, electrode terminals electrically connected to the at least two electrode assemblies, a cap plate sealing the case and exposing the electrode terminals, and at least one insulation member between the at least two electrode assemblies, the insulation member defining a space between the at least two electrode assemblies.

The insulation member may be a silicon tape or a plastic plate.

The insulation member may have a width of about 0.5 mm to about 0.7 mm.

A number of the insulation members may be one less than a number of the electrode assemblies.

Each of the electrode assemblies may further include planar portions opposite and parallel to each other, the insulation member being between planar portions of adjacent electrode assemblies, curved portions at top and bottom ends of the planar portions, and non-coating portions connecting the planar portions and the curved portions.

The insulation member may include at least two bars parallel to each other, the at least two bars being spaced apart from each other and positioned between planar portions of adjacent electrode assemblies to correspond to opposite ends of each electrode assembly.

The insulation member may have a rectangular shape with an opening in a center.

The insulation member may include at least two bars parallel to each other, the at least two bars being spaced apart from each other and positioned between adjacent electrode assemblies to correspond to opposite ends of each electrode assembly.

The at least two bars may define an opening therebetween, the opening corresponding to the space between the at least two electrode assemblies.

The insulation member may include four bars arranged in a rectangular pattern to define a rectangular opening therebetween.

The at least two bars may be spaced apart from each other horizontally to extend along opposite sides of each of the electrode assemblies.

The at least two bars may be spaced apart from each other vertically to extend along opposite sides of each of the electrode assemblies.

The secondary battery may further include at least one conductive plate electrically connected to the first or second electrode plate of the electrode assembly and positioned between the electrode assembly and the case.

The insulation member may contact each of the at least two electrode assemblies and separate therebetween, the insulation member including an opening to define the space between the electrode assemblies.

The space between the electrode assemblies may be an empty space having a thickness equal to a thickness of the insulation member.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2011-0019398, filed on Mar. 4, 2011, in the Korean Intellectual Property Office, and entitled: "Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of elements and regions may be exaggerated for clarity of illustration. It will also be understood that when an element is referred to as being "on" another element or substrate, it can be directly on the other element or substrate, or intervening elements may also be present. In addition, it will also be understood that when an element is referred to as being "between" two elements, it can be the only element between the two elements, or one or more intervening elements may also be present. Like reference numerals refer to like elements throughout.

Figure 1:
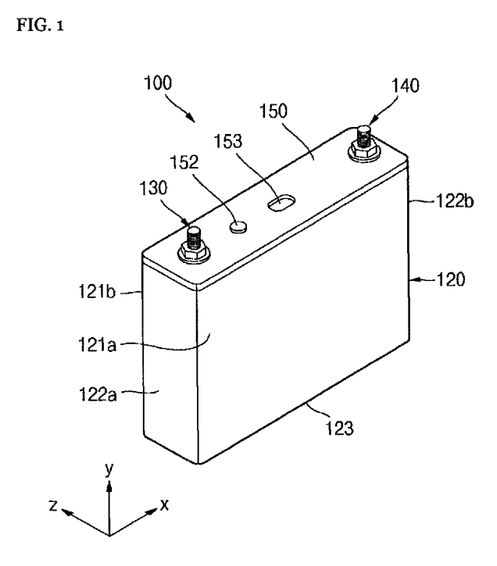
FIG. 1 illustrates a perspective view of a secondary battery according to an embodiment.

First, a secondary battery according to an embodiment will be described with reference to FIGS. 1-3. FIG. 1 illustrates a perspective view of a secondary battery according to an embodiment, FIG. 2A illustrates a vertical cross-sectional view of the secondary battery in FIG. 1, FIG. 2B illustrates a horizontal cross-sectional view of the secondary battery in FIG. 1, and FIG. 3 illustrates an exploded perspective view of an electrode assembly and an insulation member in the secondary battery of FIG. 1.

Figure 2A:
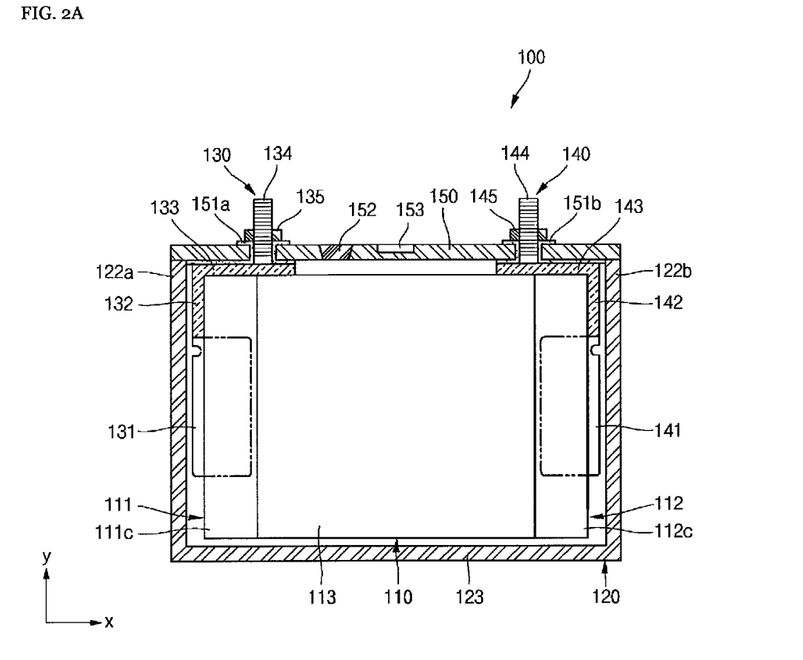
FIG. 2A illustrates a vertical cross-sectional view of the secondary battery in FIG. 1.
Figure 2B:
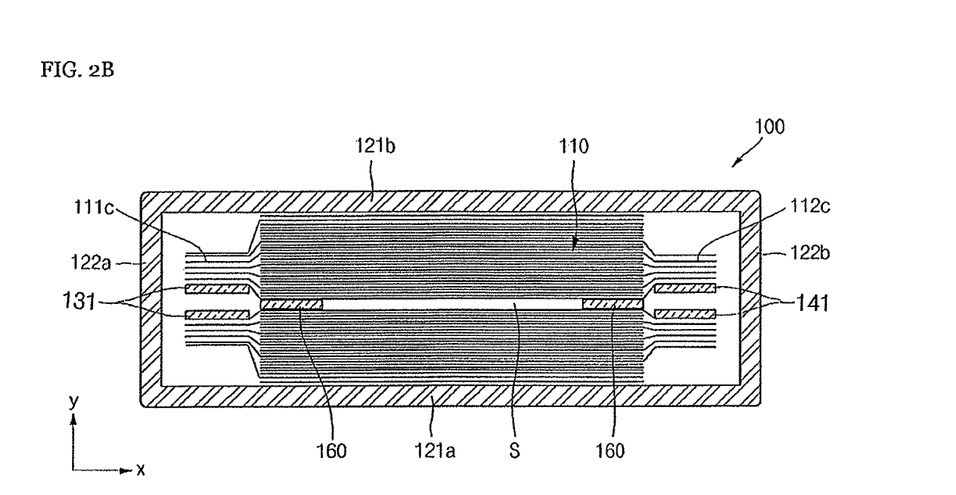
FIG. 2B illustrates a horizontal cross-sectional view of the secondary battery in FIG. 1.
Figure 3:
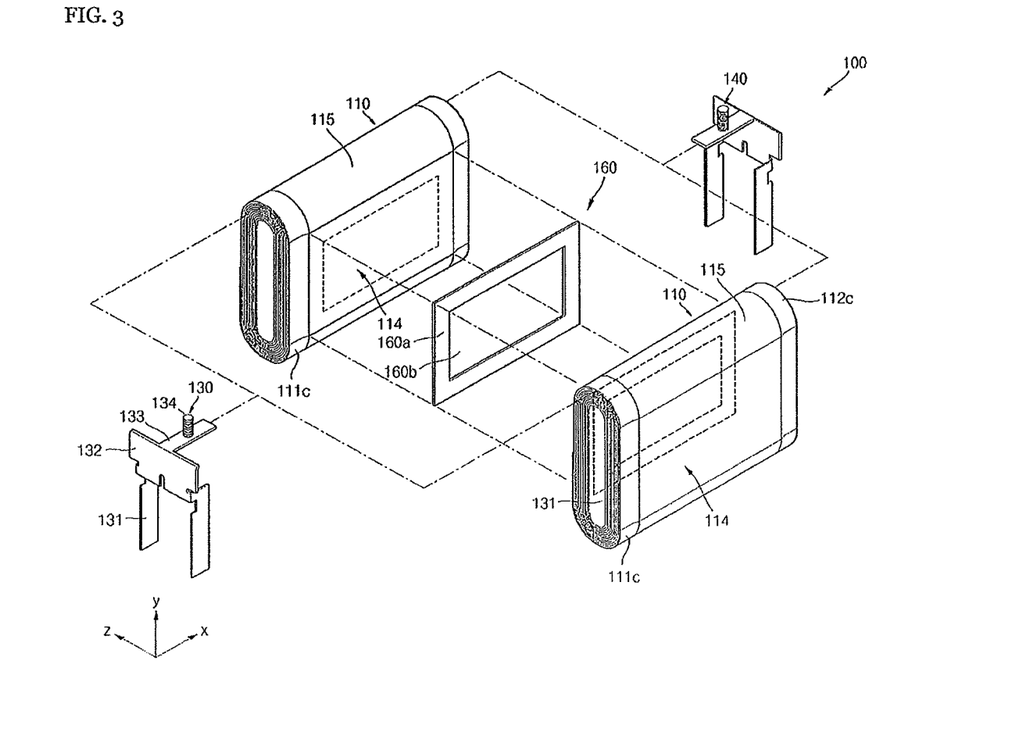
FIG. 3 illustrates an exploded perspective view of an electrode assembly and an insulation member in the secondary battery in FIG. 1.

Referring to FIGS. 1 and 2A-2B, the secondary battery 100 according to an embodiment may include an electrode assembly 110, a case 120, a first electrode terminal 130, a second electrode terminal 140, a cap plate 150, and an insulation member 160. The case 120 may also be referred to as a can.

Referring to FIG. 2A, the electrode assembly 110 may include a first electrode plate 111, a second electrode plate 112, and a separator 113. Specifically, the electrode assembly 110 may be formed by winding the first electrode plate 111, the separator 113, and the second electrode plate 112 in substantially a jelly-roll configuration or stacking the stack together. For example, the first electrode plate 111 may operate as a positive electrode and the second electrode plate 112 may operate as a negative electrode, or vice versa.

The first electrode plate 111 may include a first metal foil and a first active material. In a case where the first electrode plate 111 is a positive electrode plate, the first metal foil may be, e.g., aluminum, and the first active material may be, e.g., lithium-based oxide. The second electrode plate 112 may include a second metal foil and a second active material. In a case where the second electrode plate 112 is a negative electrode plate, the second metal foil may be, e.g., copper, and the second active material may be, e.g., graphite. Example embodiments are not limited to the materials listed herein.

The separator 113 is positioned between the first electrode plate 111 and the second electrode plate 112. The separator 113 may be formed of a porous material, e.g., polyethylene (PE), polypropylene (PP), or an equivalent thereof, but not limited thereto. The separator 113 is substantially located at opposing side surfaces of the first electrode plate 111 or the second electrode plate 112. Alternatively, the separator 113 may be located on the outermost portion of the electrode assembly 110, thereby preventing a predetermined region of the electrode assembly 110 from being shorted to the case 120, the cap plate 150, and the insulation member 160.

In addition, as illustrated in FIGS. 2A-2B, the first electrode plate 111 may include a first non-coating portion 111c, in which a positive electrode active material is not coated. The first non-coating portion 111c may protrude to the outside through one side of the separator 113. In addition, the second electrode plate 112 may include a second non-coating portion 112c, in which a negative electrode active material is not coated. The second non-coating portion 112c may protrude to the outside through the other side of the separator 113. That is to say, the first non-coating portion 111c and the second non-coating portion 112c protrude in opposite directions with respect to the separator 113.

Further, as illustrated in FIG. 3, the electrode assembly 110 may include opposing two planar portions 114 and curved portions 115 formed at top and bottom ends of the planar portions 114. For example, the planar portions 114 may be wide sides of the electrode assembly 110 corresponding to, e.g., parallel to and overlapping, wide side surfaces 121a and 121b of the case 120. For example, the curved portions 115 may include top and bottom curved portions 115 connecting tops of two planar portion 114 and bottoms of two planar portions 114, respectively. The first non-coating portion 111c may connect the planar portions 114 and the curved portions 115 along sides thereof, e.g., the planar portions 114 may extend in the xy-plane between the first and second non-coating portions 111c and 112c.

As illustrated in FIG. 1, the case 120 includes the two wide side surfaces 121a and 121b, two narrow side surfaces 122a and 122b, and a bottom surface 123. The case 120 has a top opening. The electrode assembly 110 and electrolyte are accommodated in the case 120. As illustrated in FIG. 2B, the first non-coating portion 111c and the second non-coating portion 112c of the electrode assembly 110 are disposed toward the two narrow side surfaces 122a and 122b. The case 120 may be formed of, e.g., aluminum, copper, iron, stainless steel (SUS), ceramic, polymer, and equivalents thereof, but not limited thereto.

As illustrated in FIG. 2A, the first electrode terminal 130 and the second electrode terminal 140 are electrically connected to the first electrode plate 111 and the second electrode plate 112 of the electrode assembly 110, respectively. That is to say, the first electrode terminal 130 may be welded to the first electrode plate 111, and the second electrode terminal 140 may be welded to the second electrode plate 112. More specifically, the first electrode terminal 130 may be welded to the first non-coating portion 111c of the first electrode plate 111. In addition, the second electrode terminal 140 may be welded to the second non-coating portion 112c of the second electrode plate 112.

The first electrode terminal 130 may include a first welding portion 131, a first extending portion 132, a second extending portion 133, and a bolt extending portion 134. The first welding portion 131 is inserted into the first electrode plate 111 of the electrode assembly 110, i.e., inside the first non-coating portion 111c. In addition, the second electrode terminal 140 may include a second welding portion 141, a third extending portion 142, a fourth extending portion 143, and a bolt extending portion 144. The second welding portion 141 is inserted into the second electrode plate 112 of the electrode assembly 110, i.e., inside the second non-coating portion 112c. The bolt extending portions 134 and 144 of the respective first and second electrode terminals 130 and 140 extend through the cap plate 150 and protrude outwardly.

The cap plate 150 covers the case 120, while the first electrode terminal 130 and the second electrode terminal 140 protrude therethrough outwardly. A boundary between the cap plate 150 and the case 120 may be welded by a laser. In the first electrode terminal 130 and the second electrode terminal 140, the respective bolt extending portions 134 and 144 extend through the cap plate 150, and insulators 151a and 151b may be formed at outer peripheries thereof. Accordingly, the first electrode terminal 130 and the second electrode terminal 140 may be electrically insulated from the cap plate 150. With this configuration, the case 120 and the cap plate 150 may be electrically neutral. That is to say, the case 120 and the cap plate 150 do not have any polarity (either positive or negative polarity). In some cases, however, the case 120 and the cap plate 150 may have polarity. That is to say, when the first electrode terminal 130 is electrically connected to the cap plate 150, the case 120 and the cap plate 150 may have polarity.

In addition, nuts 135 and 145 may be coupled to the bolt extending portions 134 and 144 of the first electrode terminal 130 and the second electrode terminal 140, respectively. Therefore, the first electrode terminal 130 and the second electrode terminal 140 may be tightly fixed to the cap plate 150. Moreover, an electrolyte plug 152 may be coupled to the cap plate 150, and a safety vent 153 having a relatively small thickness may also be formed in the cap plate 150. The cap plate 150 may be formed of a substantially same material as the case 120.

Referring to FIGS. 2B and 3, the insulation member 160 may be located between electrode assemblies 110. That is, when a plurality of electrode assemblies 110, e.g., two electrode assemblies 110, are positioned inside a single case 120, the insulation member 160 may be positioned therebetween. For example, as illustrated in FIG. 3, the insulation member 160 may be shaped as a rectangle having four sides. That is, the insulation member 160 may include four sides 160a, e.g., along four respective sides of the planar portion 114, surrounding an opening 160b, e.g., the insulation member 160 may have a shape of a rectangular frame. As illustrated in FIG. 2B, the insulation member 160 may be positioned between two adjacent electrode assemblies 110 to contact, e.g., directly contact, each of the adjacent electrode assemblies 110. As such, the sides 160a of the insulation member 160 separate between the adjacent electrode assemblies 110, while the opening 160b defines a space S between the adjacent electrode assemblies 110. It is noted that the space S may be an empty space defined by an opening, so a depth, i.e., thickness, of the space S along the z-axis may substantially equal the thickness of the insulation member 160 along the z-axis.

For example, the insulation member 160 may have a width in the xy-plane of about 0.5 mm to about 0.7 mm. If the width of the insulation member 160 is less than 0.5 mm, e.g., if a width of a short side 160a along the x-axis or a width of a long side 160a along the y-axis is less than 0.5 mm, an overall area of the insulation member 160 contacting the electrode assembly 110 may be too narrow, thereby lowering stability of the electrode assembly 110. If the width of the insulation member 160 is greater than 0.7 mm, an area of the opening 160b may be reduced, thereby lowering the effect of suppressing swelling.

The opening 160b may be formed at a center of the insulation member 160, and may have a rectangular shape. A size of the opening 160b may be adjusted so the insulation member 160, i.e., the sides 160a with the openings 160b, may have a size corresponding to, e.g., equal to or smaller than, that of the planar portion 114 of the electrode assembly 110. For example, the insulation member 160, i.e., the sides 160a with the opening 160b, and the planar portion 114 may overlap, i.e., completely overlap, each other. For example, the insulation member 160 may be parallel to the planar portion 114, so an entire surface area of the insulation member 160 facing the planar portion 114 may contact, e.g., directly contact, the planar portion 114.

The insulation member 160 may be a silicon tape or a plastic plate. If the insulation member 160 is formed of a silicon tape, it may exhibit high heat resistance and may demonstrate little change in adhesiveness when it is attached to or detached from the electrode assembly 110. In addition, the insulation member 160 may safely protect the electrode assembly 110 without allowing for infiltration of foreign matter, and it may exhibit high chemical resistance while not reacting with electrolyte. If the insulation member 160 is formed of a plastic plate, it may be made of a material that does not react with electrolyte, e.g., polypropylene (PP) or polyethylene (PE).

Numbers of the insulation member 160 and the electrode assembly 110 are not particularly limited. For example, FIG. 3 shows that two electrode assemblies 110 and one insulation member 160 are provided. Alternatively, three electrode assemblies 110 and two insulation members 160 formed between each of the three electrode assemblies 110 may be provided. In yet another alternative, more than three electrode assemblies 110 and insulation members 160 formed between each of the electrode assemblies 110 may also be provided. The number of the insulation members 160 is one less than that of the electrode assemblies 110. Since the insulation member 160 has the centrally formed opening 160b, a space may be formed between the electrode assemblies 110, thereby preventing the secondary battery 100 from swelling. That is, the sides 160a of the insulation member 160 in the secondary battery 100 may define a space between each two electrode assemblies 110, i.e., via the openings 160b, so the insulation members 160 may be formed between multiple electrode assemblies 110 to prevent swelling.

Figure 4:
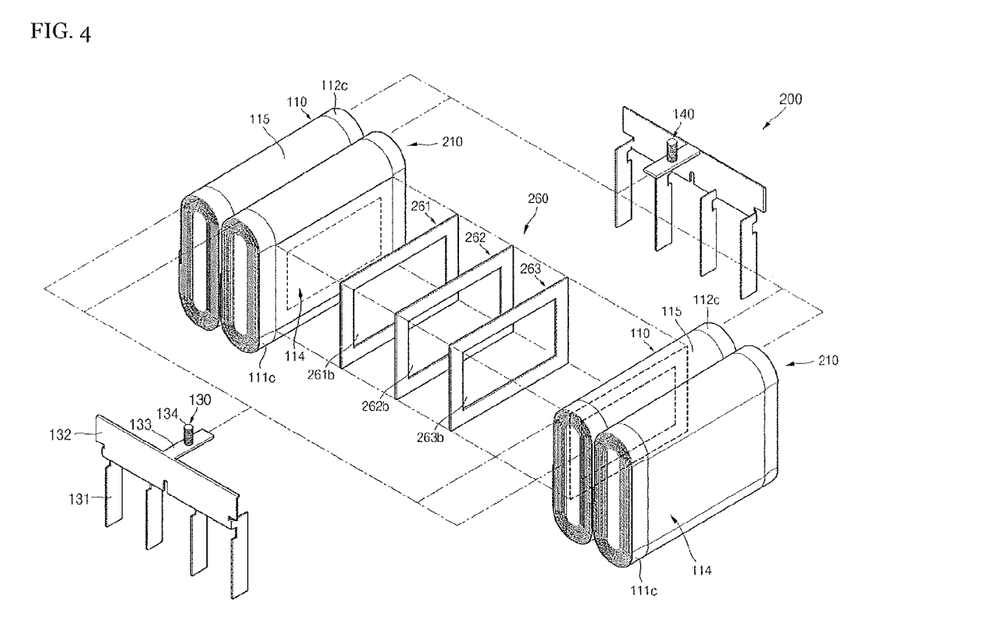
FIG. 4 illustrates an exploded perspective view of an electrode assembly and an insulation member in a secondary battery according to another embodiment.

Next, a secondary battery according to another embodiment will be described with reference to FIG. 4. FIG. 4 illustrates an exploded perspective view of insulation members between electrode assemblies in a secondary battery according to another embodiment.

Referring to FIG. 4, a secondary battery 200 according to an embodiment may include a plurality of electrode assemblies 210, the case 120, the first electrode terminal 130, the second electrode terminal 140, the cap plate 150, and an insulation member 260. The secondary battery 200 is substantially the same as the secondary battery 100 according to the previous embodiment shown in FIGS. 1-3, except for configurations of the electrode assembly 210 and the insulation member 260. Therefore, the following description will focus on the electrode assembly 210 and the insulation member 260.

The secondary battery 200 may include two or more electrode assemblies 210. Here, the first electrode terminal 130 and the second electrode terminal 140 are electrically connected to the two electrode assemblies 210. In an exemplary embodiment, the first electrode terminal 130 may include the first welding portion 131, the first extending portion 132, the second extending portion 133, and the bolt extending portion 134. In addition, the first electrode terminal 130 may be electrically connected to the first non-coating portion 111c formed in each of the two electrode assemblies 210. The second electrode terminal 140 may have the same configuration as the first electrode terminal 130. The second electrode terminal 140 may also be electrically connected to the second non-coating portion 112c formed in each of the two electrode assemblies 210.

The insulation member 260 may include a plurality of insulation members 261, 262, and 263 positioned along sides of planar portions 114 of any one of the two electrode assemblies 210. For example, the plurality of insulation members 261, 262, and 263 may be parallel to each other, and may be positioned in contact with each other between two, e.g., between every two, adjacent electrode assemblies 210. Each of the insulation members 261, 262, and 263 may be identical to the insulation member 160 described previously. Since the insulation member 260 has centrally formed holes 261b, 262b, and 263b, spaces are formed between each of the electrode assemblies 210, thereby preventing the secondary battery 200 from swelling.

Figure 5:
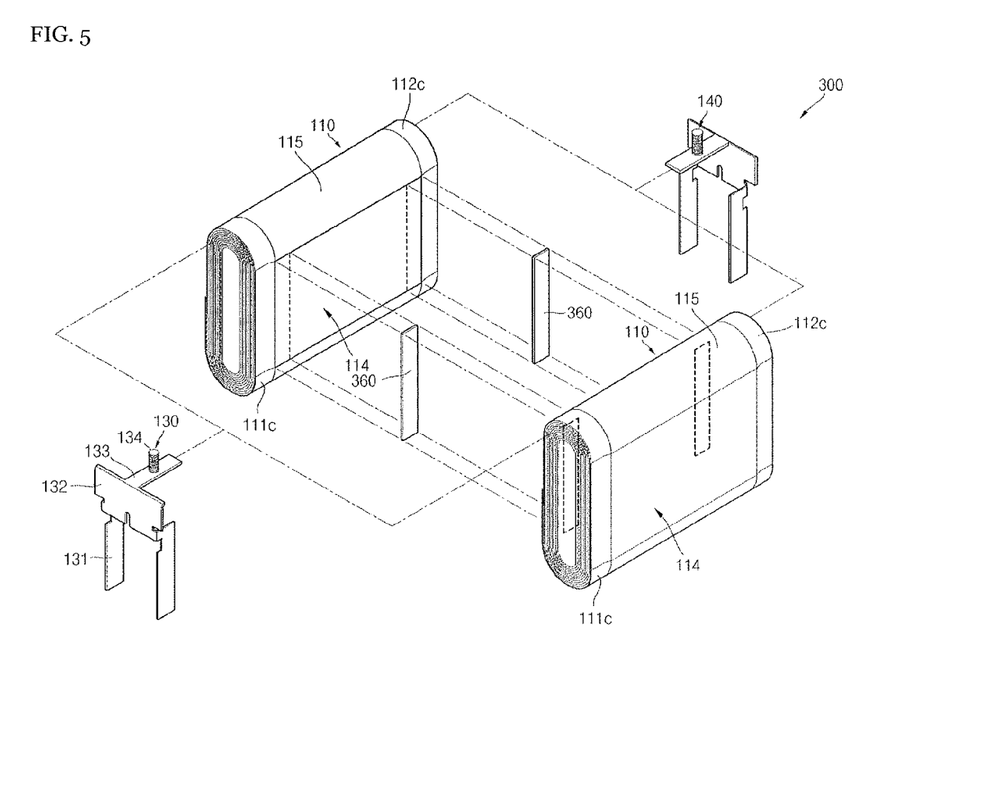
FIG. 5 illustrates an exploded perspective view of an electrode assembly and an insulation member in a secondary battery according to another embodiment.

Next, a secondary battery according to another embodiment will be described with reference to FIG. 5. FIG. 5 illustrates an exploded perspective view of an electrode assembly and an insulation member in a secondary battery according to another embodiment.

Referring to FIG. 5, a secondary battery 300 may include the plurality of electrode assemblies 110, the case 120, the first electrode terminal 130, the second electrode terminal 140, the cap plate 150, and an insulation member 360. The secondary battery 300 according to the present embodiment is substantially the same as the secondary battery 100 according to the embodiment shown in FIGS. 1-3, except for the structure and configuration of the insulation member 360. Therefore, the following description will focus on the insulation member 360.

The insulation member 360 may be formed between planar portions 114 of adjacent electrode assemblies 110. The insulation member 360 may include rectangular bars formed vertically, e.g., along the y-axis, along opposing ends of the planar portion 114 to be spaced apart from each other along the horizontal direction, i.e., along the x-axis. The insulation member 360 may be vertically formed in the left and right sides of the planar portion 114. Since the bars of the insulation member 360 are formed at opposing sides of the planar portion 114, a space is formed between adjacent electrode assemblies 110, thereby preventing the secondary battery 300 from swelling. It is noted that a dashed line on one of the electrode assemblies 110 in FIG. 5 (rectangle) illustrates positioning of each of the bars with respect to the electrode assemblies.

Figure 6:
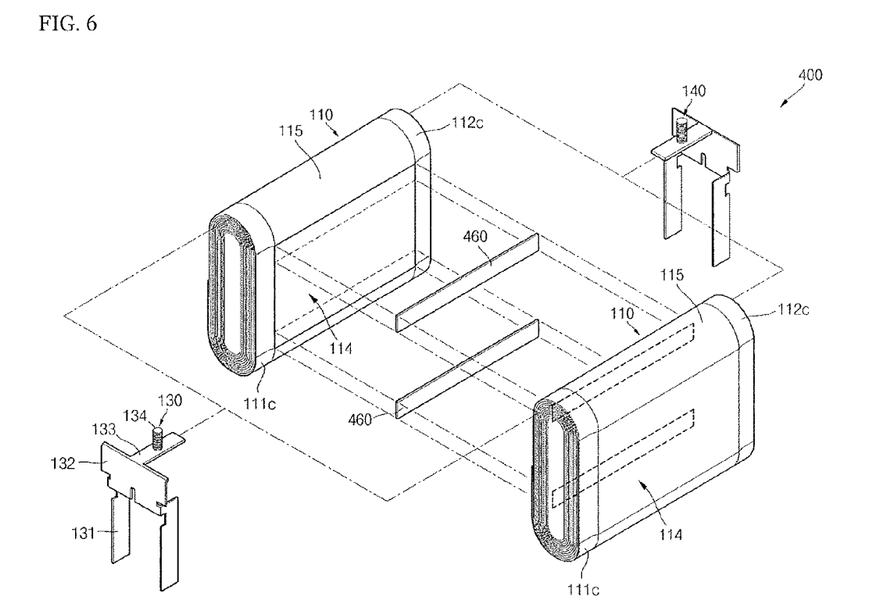
FIG. 6 illustrates an exploded perspective view of an electrode assembly and an insulation member in a secondary battery according to another embodiment.

Next, a secondary battery according to still another embodiment will be described with reference to FIG. 6. FIG. 6 illustrates an exploded perspective view of an electrode assembly and an insulation member in a secondary battery according to another embodiment.

Referring to FIG. 6, a secondary battery 400 according to the present embodiment may include the plurality of electrode assemblies 110, the case 120, the first electrode terminal 130, the second electrode terminal 140, the cap plate 150, and insulation members 460. The secondary battery 400 according to the present embodiment is substantially the same as the secondary battery 100 according to the embodiment shown in FIGS. 1 and 2, except for the structure and configurations of the insulation members 460. Therefore, the following description will focus on the insulation members 460.

The insulation members 460 may be formed between planar portions 114 of adjacent electrode assemblies 110, and may include rectangular bars horizontally formed, e.g., along the x-axis, along opposing sides of the planar portions 114 to be spaced apart from each other. The insulation members 460 may be horizontally formed at upper and lower ends of the planar portions 114. Since the insulation members 460 are formed at opposing sides of the planar portions 114, a space is formed at the center between the adjacent electrode assemblies 110, thereby preventing the secondary battery 400 from swelling.

Figure 7A:
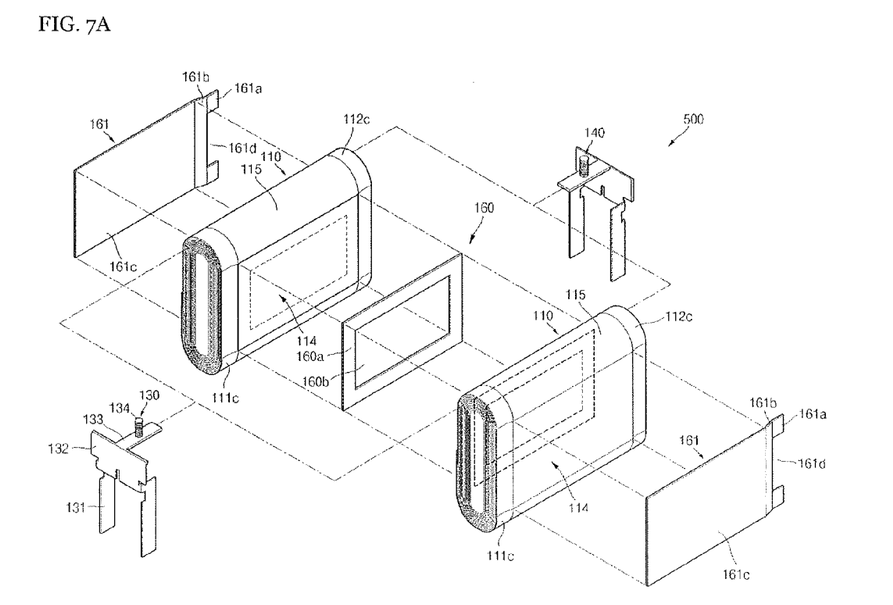
FIG. 7A illustrates an exploded perspective view of an electrode assembly and an insulation member in a secondary battery according to another embodiment.

Next, a secondary battery according to another embodiment will be described with reference to FIGS. 7A-7B. FIG. 7A illustrates an exploded perspective view of an electrode assembly and an insulation member in a secondary battery according to another embodiment, and FIG. 7B illustrates a horizontal cross-section of FIG. 7A.

Figure 7B:
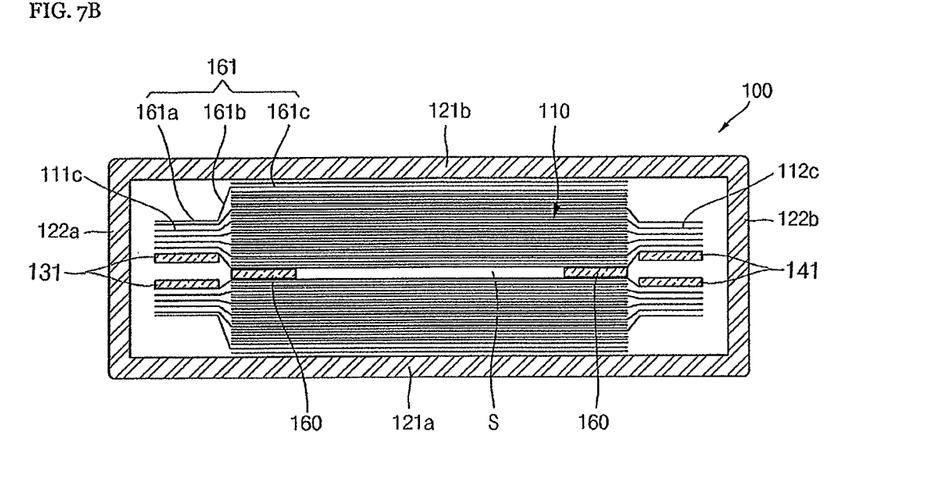
FIG. 7B illustrates a horizontal cross-sectional view of an assembled secondary battery illustrated in FIG. 7A.

Referring to FIGS. 7A-7B, a secondary battery 500 according to the present embodiment may include the plurality of electrode assemblies 110, the case 120, the first electrode terminal 130, the second electrode terminal 140, the cap plate 150, the insulation member 160, and a conductive plate 161. The secondary battery 500 is substantially the same as the secondary battery 100 in FIGS. 1-3, except that the conductive plate 161 is additionally provided. Therefore, the following description will focus on the conductive plate 161.

Each of the conductive plates 161 may include a first region 161a welded to a second non-coating portion 112c of the electrode assembly 110, and a second region 161b extending from the first region 161a and covering a planar portion 114 of the electrode assembly 110. Here, a horizontal width of the first region 161a is substantially equal to that of the second non-coating portion 1 12c, and a horizontal width of the second region 161b is substantially equal to that of the planar portion 114 of the electrode assembly 110. In addition, the first region 161a is directly welded to the second non-coating portion 112c to be electrically connected thereto. Further, the second region 161b covers substantially the entire surface of the planar portion 114 of the electrode assembly 110, thereby improving a puncture characteristic and crushing safety of the secondary battery.

The conductive plate 161 may be formed of, e.g., aluminum (Al) or copper (Cu), but not limited thereto. Although not shown, an insulator may be formed between the conductive plate 161 and the case 120. In particular, in a case where the second non-coating portion 112c is formed of copper, the conductive plate 161 is preferably formed of copper. For example, the conductive plate 161 may have a thickness of about 100 μm to about 400 μm. When an electrical short due to puncture or crushing occurs to the secondary battery in the above-stated numerical scope, the secondary battery undergoes a relatively small increase in the internal temperature thereof. In addition, while a sheet of the conductive plate 161 is illustrated in the drawing, the conductive plate 161 may be formed in a plurality of sheets. Since the conductive plate 161 has relatively small electrical resistance, little heat is generated even when an electrical short occurs, and a large amount of current is rapidly consumed. Accordingly, since little heat is generated when the secondary battery is punctured or crushed, the safety and reliability of the secondary battery can be improved.

In the secondary battery having the insulation member 160 located between at least two electrode assemblies 110, a space may be formed between the at least two electrode assemblies 110. For example, when a nail (not shown) is inserted, e.g., during a nail puncture test, through the case 1 20, the space formed between the electrode assemblies 110 is reduced while deformation of the case 120 is minimized. Therefore, the nail, i.e., any metal rod, may be accurately inserted through the case 120, thereby improving a puncture characteristic of the secondary battery, e.g., during testing. That is, the case 120 and the conductive plate 161 may be electrically shorted by an inserted metal rod, thereby avoiding explosion or fire of the secondary battery.

As described above, in the secondary battery according to example, embodiments, swelling can be reduced by increasing internal space efficiency. In addition, a puncture characteristic of the secondary battery can be improved by reducing a space between the electrode assembly and the case.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising: at least two electrode assemblies, each electrode assembly including a first electrode plate, a separator, and a second electrode plate, and each of the first and second electrode plates including a coated portion and a non-coating portion; a case accommodating the at least two electrode assemblies; electrode terminals electrically connected to the at least two electrode assemblies; a cap plate sealing the case and exposing the electrode terminals; and at least one insulation member between the coated portions of the at least two electrode assemblies, the insulation member overlapping the coated portions of each of the at least two electrode assemblies and defining a space between the coated portions of the at least two electrode assemblies, wherein: a number of the at least one insulation member is one less than a number of the electrode assemblies, and the insulation member has a rectangular shape with an opening in a center and includes four sides that are connected as one; wherein the insulation member is an adhesive tape.

2. The secondary battery as claimed in claim 1, wherein the insulation member is a silicon tape.

3. The secondary battery as claimed in claim 1, wherein the insulation member has a width of about 0.5 mm to about 0.7 mm.

4. The secondary battery as claimed in claim 1, wherein each of the electrode assemblies includes the first electrode plate, the separator, and the second electrode plate rolled together into a jelly-roll structure,
wherein each of the jelly-roll structures has planar portions opposite and parallel to each other, the coated portions of the first and second electrode plates being on the planar portions, and the insulation member being between planar portions of adjacent electrode assemblies,
wherein each of the jelly-roll structures has curved portions at top and bottom ends of the planar portions, the coated portions of the first and second electrode plates extending onto the curved portions and being continuous with the planar portions, and
wherein the non-coating portions extend from each of the planar portions and the curved portions along a direction perpendicular to a direction connecting opposite planar portions.

5. The secondary battery as claimed in claim 4, wherein the insulation member includes at least two bars parallel to each other, the at least two bars being spaced apart from each other and positioned between planar portions of adjacent electrode assemblies to correspond to opposite ends of each electrode assembly.

6. The secondary battery as claimed in claim 1, wherein the non-coating portion in each electrode assembly is at two opposite edges of the coated portion, the insulating member overlapping only the coated portion among the coated portion and the non-coating portion.

7. The secondary battery as claimed in claim 1, wherein the insulating member contacts only the coated portion among the coated portion and the non-coating portion, the non-coating portion extending from an edge of the coated portion beyond the non-coating portion toward a sidewall of the case.

8. The secondary battery as claimed in claim 1, wherein the electrode terminals are electrically connected to the non-coating portions, the insulator member being horizontally and vertically spaced apart from the electrode terminals.

9. The secondary battery as claimed in claim 1, further comprising at least one conductive plate electrically connected to the first or second electrode plate of the electrode assembly and positioned between the electrode assembly and the case.

10. The secondary battery as claimed in claim 1, wherein the insulation member contacts each of the coated portions of the at least two electrode assemblies and separates therebetween, the insulation member including an opening to define the space between the electrode assemblies.

11. The secondary battery as claimed in claim 10, wherein the space between the coated portions of the electrode assemblies is an empty space having a thickness equal to a thickness of the insulation member.

12. The secondary battery as claimed in claim 10, wherein the insulation member directly contacts each of the coated portions of the electrode assemblies and an electrolyte within the case.

13. A secondary battery, comprising: at least two electrode assemblies, each electrode assembly including a first electrode plate, a separator, and a second electrode plate rolled together into a jelly-roll structure including planar portions opposite and parallel to each other, and curved portions at top and bottom ends of the planar portions, and each of the first and second electrode plates including a coated portion and a non-coating portion; a case accommodating the at least two electrode assemblies; electrode terminals electrically connected to the at least two electrode assemblies; a cap plate sealing the case and exposing the electrode terminals; and at least one insulation member between the coated portions of the at least two electrode assemblies, the insulation member directly contacting the planar portions of the at least two electrode assemblies and overlapping only the coated portions of the at least two electrode assemblies, the insulation member defining a space between the coated portions of the at least two electrode assemblies; wherein the insulation member is an adhesive tape.

14. The secondary battery as claimed in claim 13, wherein the insulation member has a rectangular shape with am opening in a center.

15. The secondary battery as claimed in claim 13, wherein the insulation member includes at least two bars parallel to each other, the at least two bars being spaced apart from each other and positioned between adjacent electrode assemblies to correspond to opposite ends of each electrode assembly.

16. The secondary battery as claimed in claim 15, wherein the at least two bars define an opening therebetween, the opening corresponding to the space between the at least two electrode assemblies.

17. The secondary battery as claimed in claim 16, wherein the insulation member includes four bars arranged in a rectangular pattern to define a rectangular opening therebetween.

18. The secondary battery as claimed in claim 16, wherein the at least two bars are spaced apart from each other horizontally to extend along opposite sides of each of the electrode assemblies.

19. The secondary battery as claimed in claim 16, wherein the at least two bars are spaced apart from each other vertically to extend along opposite sides of each of the electrode assemblies.

* * * * *